US007909376B1

(12) United States Patent
McKinley

(10) Patent No.: US 7,909,376 B1
(45) Date of Patent: Mar. 22, 2011

(54) LINEMAN'S POLE AND HOOK ASSEMBLY

(76) Inventor: Larry W. McKinley, Bensalem, PA (US)

( * ) Notice: Subject to any disclaimer, the term of this patent is extended or adjusted under 35 U.S.C. 154(b) by 260 days.

(21) Appl. No.: 12/236,110

(22) Filed: Sep. 23, 2008

(51) Int. Cl.
*B25J 1/00* (2006.01)

(52) U.S. Cl. ........................................ 294/19.1; 81/53.1

(58) Field of Classification Search ................. 294/19.1, 294/24; 81/3.8, 53.1
See application file for complete search history.

(56) References Cited

U.S. PATENT DOCUMENTS 378,891 A * 3/1888 Loftie ............................. 294/24
1,024,968 A * 4/1912 Beglinger .................... 294/19.1
1,865,526 A * 7/1932 Lawlor ......................... 294/19.1
2,299,838 A * 10/1942 Mays ............................. 81/53.1
2,543,862 A * 3/1951 Manahan ..................... 294/19.1
3,888,535 A * 6/1975 Rosso .......................... 294/19.1
5,742,220 A * 4/1998 Scherer ......................... 337/171
5,861,595 A * 1/1999 Wood et al. ..................... 218/12
6,457,557 B1 * 10/2002 Anderson et al. ............. 182/129
6,518,871 B2 * 2/2003 Fennell ......................... 337/171
6,725,745 B1 * 4/2004 Palmieri ......................... 81/53.1
2006/0150779 A1 * 7/2006 Rider ............................. 81/53.1

* cited by examiner

*Primary Examiner* — Dean J Kramer
(74) *Attorney, Agent, or Firm* — Lamorte & Associates, P.C.

(57) ABSTRACT

An electrical lineman's pole having a top end and a bottom end. A post extends laterally from the pole proximate its top end. A slot receptacle is provided proximate the post. The slot receptacle has an open top that faces the post and extends in a line perpendicular to the post. To utilize the lineman's pole, the top end is brought into contact with a swinging conductive arm of a protective cutout device. The post extending from the pole is passed through the loop on the swinging conductive arm. A portion of the loop is positioned into the slot receptacle. A lineman pushes on the pole assembly to rotate the swinging conductive arm. The portion of the loop in the slot receptacle prevents the swinging conductive arm from rotating out of a selected plane. Consequently, the cutout protective device does not turn from side to side.

10 Claims, 4 Drawing Sheets

LINEMAN'S POLE AND HOOK ASSEMBLY

BACKGROUND OF THE INVENTION

1. Background of the Invention

In general, the present invention relates to the structure of poles used by linemen of an electrical power company to touch and reset protective cutout devices. More particularly, the present invention relates to the structure of the hook at the tip of the lineman's pole and the method of using such a hook.

2. Prior Art Description

Overhead power lines are used to transmit electrical power throughout most of the United States. Such overhead power lines contain protective cutout devices at strategic points. A protective cutout device is essentially a conductive element that is held in an insulated holder. The insulated holder is connected to a power line. The electricity flowing through the power line passes through the conductive element in the cutout device. Using a pole, a lineman can pull the conductive element from the insulated housing and stop the flow of electricity through a particular power line. This enables linemen down stream to safely work on the power lines without fear of electrocution.

A protective cutout device is formed from two basic parts. Those parts include a conductive arm and the insulated housing. The conductive arm is connected to the insulated housing by a pivot. When the pulled by a lineman's pole, one end of the conductive arm separates from the insulated housing. Gravity then causes the conductive arm to swing down from the insulated housing. In this manner, a lineman can see which protective cutout is open by a simple visible inspection.

When work on a power line needs to be done, a lineman finds the protective cutouts that will isolate that section of the power line. The conductive arms are then pulled open to stop the flow of electricity Once the work is done, the conductive arms are pivoted back into their operational positions using a long pole, commonly called a hot stick.

The pole used by linemen has a hook at one end. The hook is used to engage a loop on the swinging conductive arm. Once the loop on the swinging conductive arm is engaged with the hook on the pole, the lineman then manipulates the pole to push or pull the conductive arm back into its operational position.

Pushing a swinging conductive arm back into its proper operational position with a long pole is not always easy. Protective cutout devices are often located on suspended wires that easily sway. Furthermore, the hook on the pole makes a very loose connection with the loop on the swinging conductive arm. As a result, when force is applied to the pole and hook, that force tends to rotate the entire protective cutout device rather than move just the swinging conductive arm. This prevents the conductive arm from firmly seating into its operational position. As a consequence, it often takes a lineman several attempts to properly reset a swinging conductive arm. Furthermore, in some circumstances, two linemen are required. One lineman holds the protective cutout device steady, while the other sets the swinging conductive arm.

A need therefore exists for improving the equipment and methods used by linemen to set swinging conductive arms on protective cutout devices. In this manner, linemen can reset protective cutout devices in less time and with less labor. This need is met by the present invention as described and claimed below.

SUMMARY OF THE INVENTION

The present invention is an improved electrical lineman's pole and its associated method of use. The lineman's pole has a top end and a bottom end. A post extends laterally from the pole proximate its top end. A slot receptacle is provided proximate the post. The slot receptacle has an open top that faces the post and extends in a line perpendicular to the post.

Power lines have protective cutout devices with swinging conductive arms that swing free when open. Each swinging conductive arm contains a loop that enables the swinging conductive arm to be engaged by a lineman's pole. To utilize the present invention, the top end of the pole is brought into contact with a swinging conductive arm. The post extending from the pole is passed through the loop on the swinging conductive arm. Furthermore, a portion of the loop is positioned into the slot receptacle. A lineman pushes on the pole assembly to rotate the swinging conductive arm in a selected plane. The portion of the loop in the slot receptacle prevents the swinging conductive arm from rotating out of the selected plane. Consequently, the protective cutout device does not turn from side to side during the resetting procedure. The swinging conductive arm can therefore be reset in a more time efficient and labor efficient manner.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
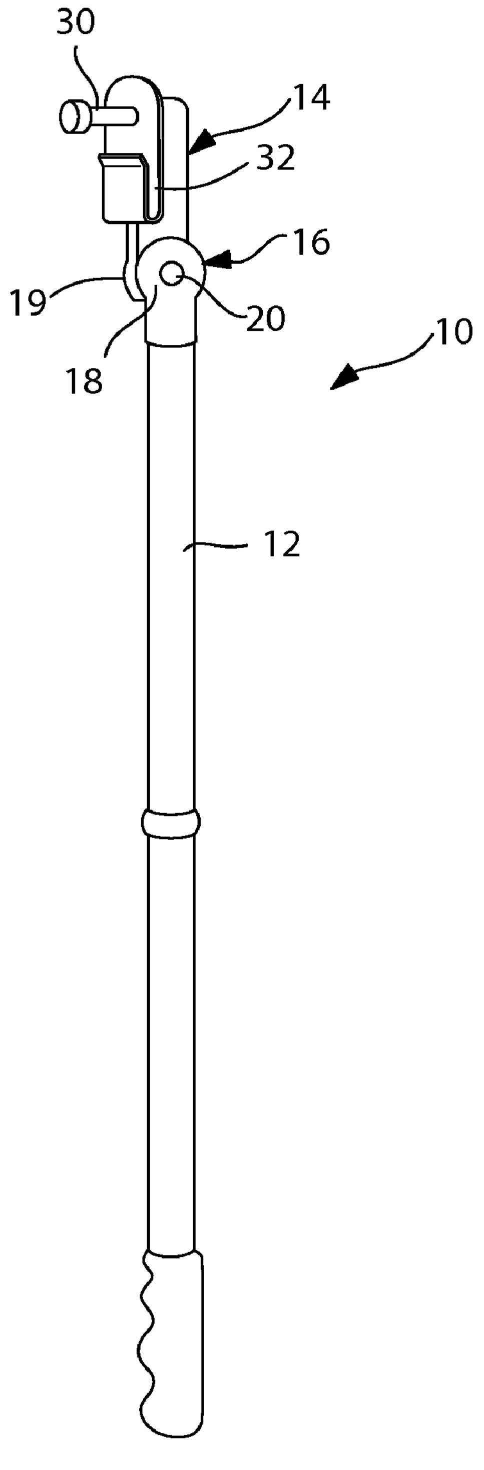
FIG. 1 is a perspective view of an exemplary embodiment of a lineman's pole assembly.
Figure 2:
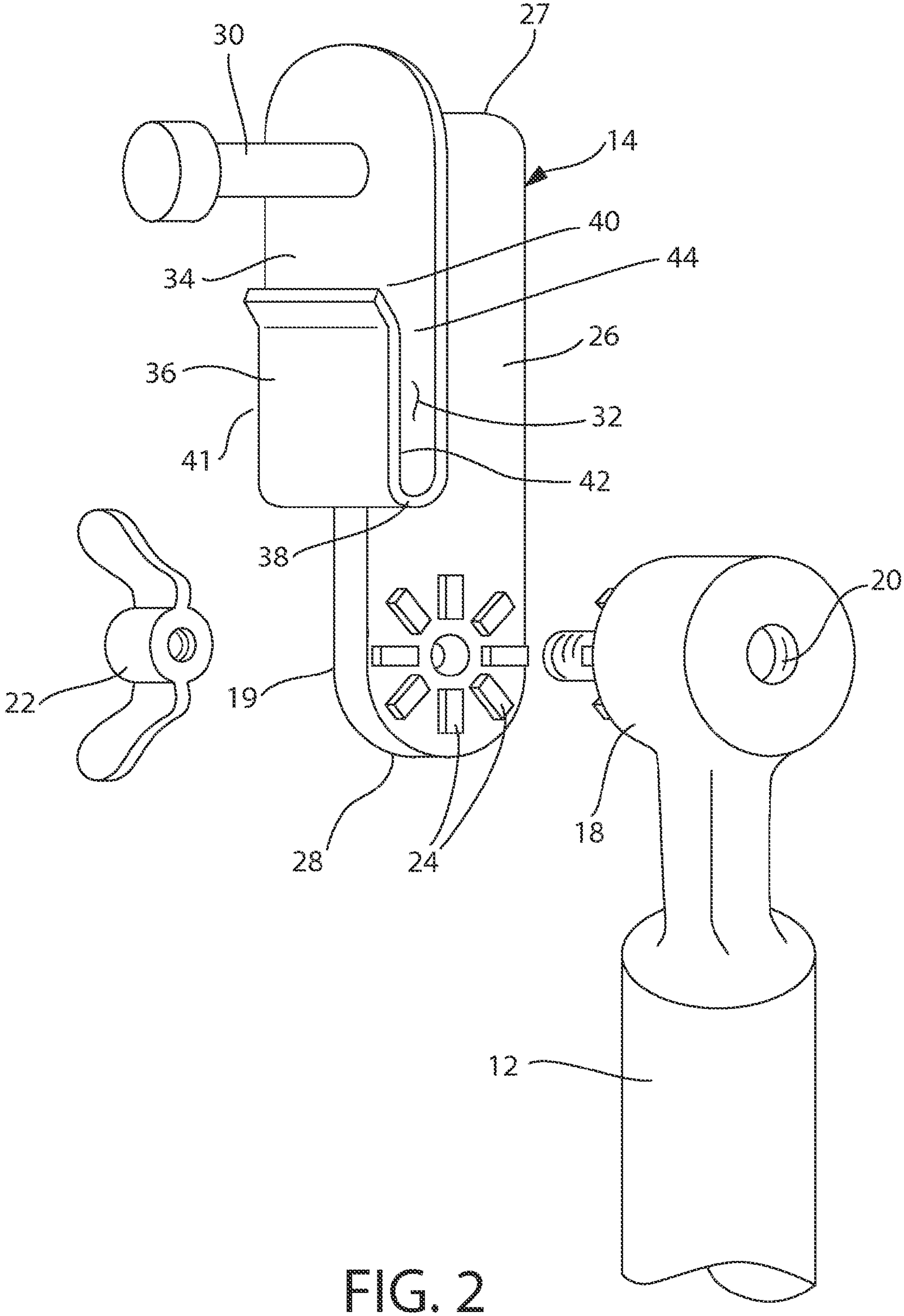
FIG. 2 is an enlarged view of the assemblage at the top of the exemplary lineman's pole assembly.

Referring to FIG. 1 in conjunction with FIG. 2, an exemplary embodiment of a pole assembly 10 is shown. The pole assembly 10 contains a long dielectric pole or shaft 12. The shaft 12 may be set in length or may be adjustable in length, such is commonplace with various lineman's poles.

A hook assemblage 14 is coupled to the distal end of the shaft 12. The hook assemblage 14 may be permanently affixed in a set position at the end of the shaft 12. However, in the shown embodiment, the hook assemblage 14 is coupled to the shaft 12 at a joint connection 16. The joint connection 16 is a pivot joint having two halves 18, 19 that are held together by a bolt 20 and butterfly nut 22. One half 18 of the joint connection 16 is formed at the end of the shaft 12. The other half 19 of the joint connection 16 is formed as part of the hook assemblage 14.

Teeth 24 are formed on both halves 18, 19 of the joint connection 16. The teeth 24 intermesh at various positions. It will therefore be understood that the hook assemblage 14 and the shaft 12 can be placed into a variety of relative orientations. Once a selected orientation is obtained, the butterfly nut 22 is tightened on the bolt 20 to prevent the hook assemblage 14 from inadvertently moving with respect to the shaft 12.

The hook assemblage 14 includes a shank section 26. The shank section 26 has a top end 27 and a bottom end 28. The teeth 24 of one half 19 of the joint connection 16 are disposed proximate the bottom end 28 of the shank section 26. A post 30 extends away from the shank section 26 proximate the top end 27. The post 30 extends away from the shank section 26 at a perpendicular.

A slot receptacle 32 is provided directly below the post 30. The slot receptacle 32 is defined by a rear wall 34, a front wall 36 and a closed bottom 38. The slot receptacle 32 creates a confined slot having an open top 40 and two open sides 41, 42. The plane of the slot receptacle 32 and the run of the open top 40 are both perpendicular to the length of the post 30. Furthermore, the post 30 is positioned a short distance above the center of the open top 40 of the slot receptacle 32.

The slot receptacle 32 is narrow, having a gap space 44 between the front wall 36 and rear wall 34 of no more than one centimeter. The front wall 36 of the slot receptacle 32 may have a slight flare to facilitate the passage of a loop into the slot receptacle 32, as will later be explained.

Figure 3:
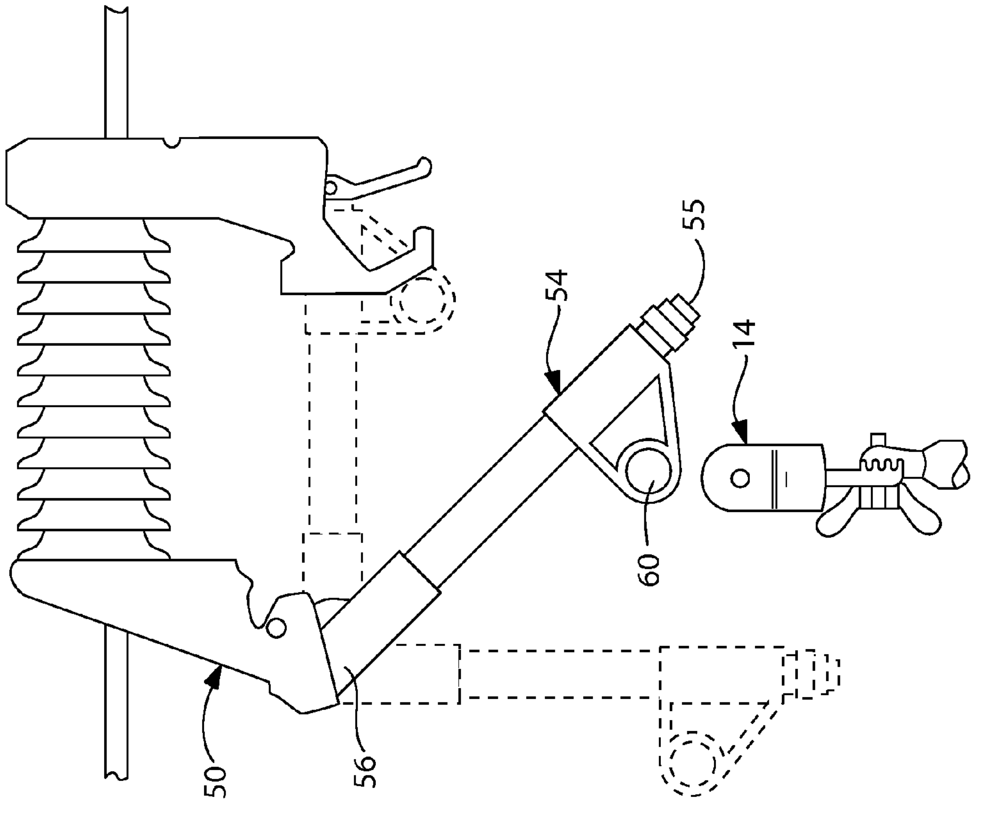
FIG. 3 is a side view of the assemblage of FIG. 2 shown in conjunction with a prior art protective cutout device.

Referring to FIG. 3, there is shown the present invention hook assemblage 14 in conjunction with a traditional protective cutout device 50. The protective cutout device 50 has a swinging conductive arm 54. The swinging conductive arm 54 has a free end 55 and an opposite pivoted end 56. When in an operational position, the free end 55 of the swinging conductive arm 54 is engaged with the protective cutout device 50. When pulled open by a lineman, the swinging conductive arm 54 pivots and the free end 55 of the conductive arm 54 swings free. A loop 60 is disposed at the free end 55 of the swinging conductive arm 54 in order to make the swinging conductive arm 54 accessible by a lineman's pole.

Figure 4:
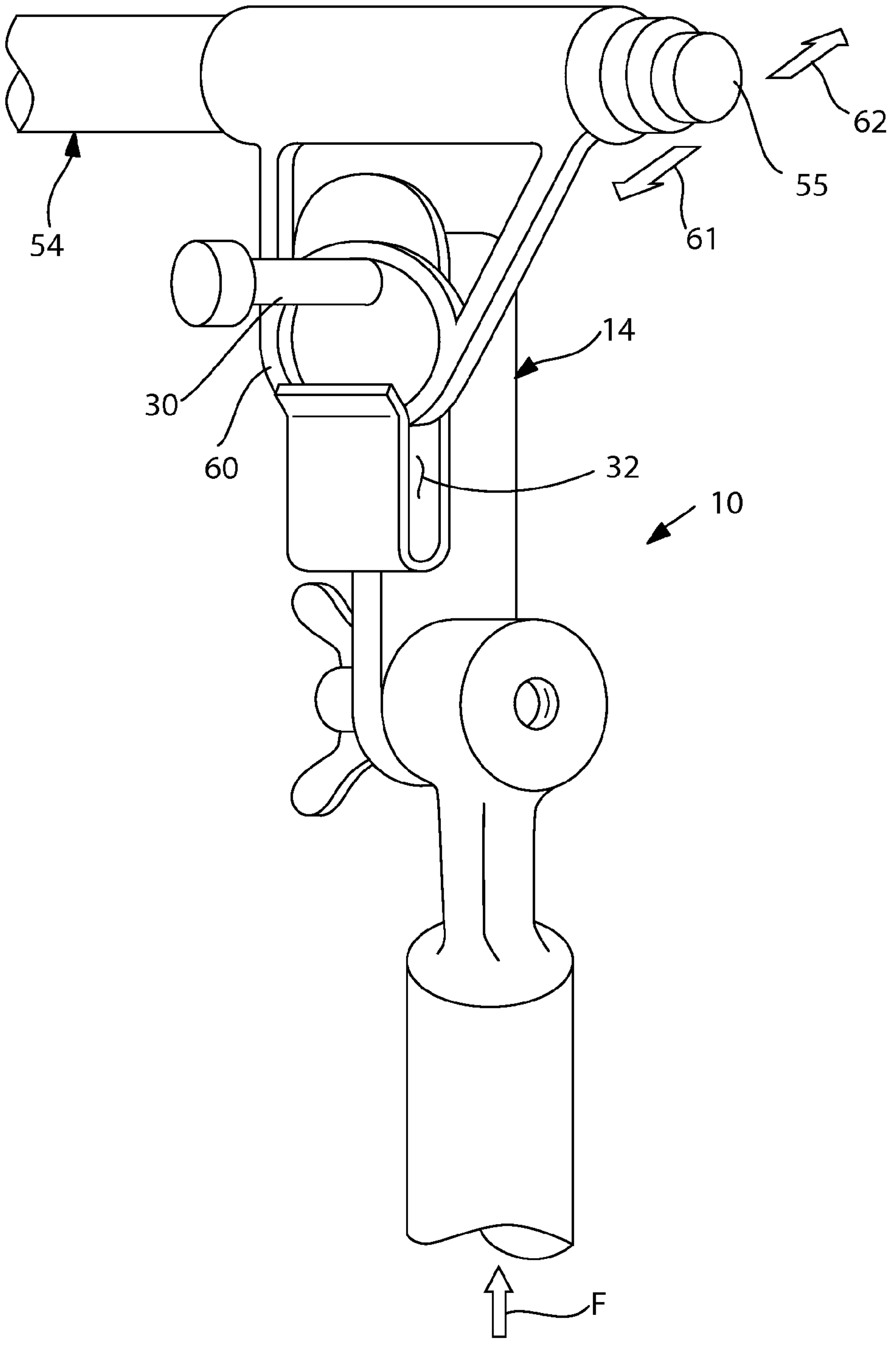
FIG. 4 is a perspective view of the assemblage of FIG. 2 engaging a loop from a prior art protective cutout device.

Referring to FIG. 4 in conjunction with FIG. 3, it can be seen that in order to use the present invention pole assembly 10, the hook assemblage 14 is raised to the height of the swinging conductive arm 54. The post 30 extending from the hook assemblage 14 is then passed through the loop 60 at the free end 55 of the swinging conductive arm 54. Once the post 30 passes into the loop 60, the hook assemblage 14 is manipulated by a lineman until the bottom of the loop 60 passes into the slot receptacle 32. Once the post 30 extends through the loop 60 and the loop 60 is present within the slot receptacle 32, the swinging conductive arm 54 is considered to be positively engaged by the hook assemblage 14. This condition of positive engagement is illustrated in FIG. 4.

When the hook assemblage 14 is in positive engagement with the loop 60 on the swinging conductive arm 54, it will be understood that the loop 60 cannot swing laterally in the directions of arrows 61, 62 independently of the hook assemblage 14. Accordingly, when a lineman pushes up on the pole assembly 10 and creates an upward force F, that force F cannot cause the swinging conductive arm 54 to rotate in the direction of arrow 61 or arrow 62. Rather, the upward force F is maintained in a vertical direction and rotates the swinging conductive arm 54 back into its operational position.

As a consequence, the old problem of having the swinging conductive arm 54 move laterally when pushed is removed. A lineman can therefore reset the swinging conductive arm 54 in a more time and labor efficient manner.

It will be understood that there are a wide variety of protective cutout devices that are currently in use. Different protective cutout devices have different loop sizes, loop thicknesses and loop positions. Accordingly, it should be understood that different hook assemblages can be manufactured for different protective cutout devices. The shown hook assemblage should therefore be considered a mere example. A person skilled in the art can modify the exemplary configuration to better fit specific needs. All such variations, modifications, and alternate embodiments are intended to be included within the scope of the present invention as defined by the claims.

What is claimed is:

1. On a power line having a protective cutout device with a swinging conductive arm that swings free when blown, wherein a loop is present on said swinging conductive arm, a method of engaging said loop on said swinging conductive arm with a pole assembly, said method comprising the steps of:

providing a pole assembly having a straight pole, a post extending laterally in a first direction therefrom and a slot receptacle under said post having a top opening that faces said post and extends in a direction perpendicular to said first direction of said post;

passing said post through said loop on said swinging conductive arm;

positioning a portion of said loop into said slot receptacle while said post is extending through said loop;

pushing on said pole assembly to rotate said swinging conductive arm in a selected plane, wherein said portion of said loop in said slot receptacle prevents said swinging conductive arm from rotating out of said selected plane.

2. The method according to claim 1, wherein said slot receptacle has open sides that extend in lines generally parallel to said shaft.

3. The method according to claim 1, wherein said step of providing a pole assembly includes providing an assemblage atop said pole, wherein said post and said slot receptacle are part of said assemblage.

4. The method according to claim 3, wherein said assemblage connects to said pole at an adjustable joint.

5. The method according to claim 4, further including the step of adjusting said adjustable joint to achieve a selected orientation between said assemblage and said pole.

6. An electrical lineman's pole, comprising:

a pole assembly having a top end and a bottom end:

a post extending laterally in a first direction from said pole assembly proximate said top end;

a slot receptacle supported by said pole assembly proximate said post, said slot receptacle having a rear wall, a front wall, a closed bottom, an open top and a gap space between the front wall and rear wall of no more than one centimeter, wherein said open top faces said post and extends in a direction perpendicular to said first direction of said post.

7. The pole according to claim 6, wherein said slot receptacle has open sides that extend in lines generally parallel to said pole.

8. The pole according to claim 6, wherein said pole assembly supports an assemblage at said top end, wherein said post and said slot receptacle are part of said assemblage.

9. The pole according to claim 8, wherein said assemblage connects to said top end of said pole at an adjustable joint.

10. A hook assemblage for use atop a lineman's pole, said assemblage comprising:

a shank having a top end and a bottom end;

a connector disposed at said bottom end of said shank to interconnect said assemblage to said lineman's pole;

a post extending laterally in a first direction from said shank proximate said top end;

a slot receptacle proximate said post, said slot receptacle having a rear wall, a front wall, a closed bottom, an open top and a gap space between the front wall and rear wall of no more than one centimeter, wherein said open top faces said post and extends in a second direction that is perpendicular to said first direction of said post.

* * * * *